Dec. 24, 1935.  A. L. FREEDLANDER  2,025,278
METHOD OF MAKING POWER TRANSMISSION BELTS
Filed May 12, 1934
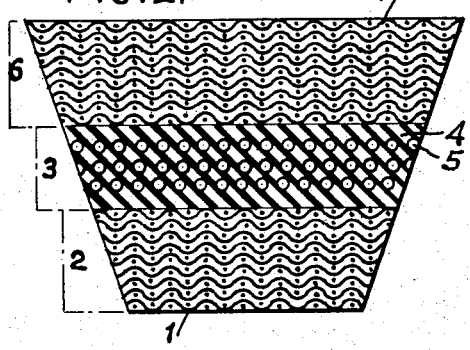
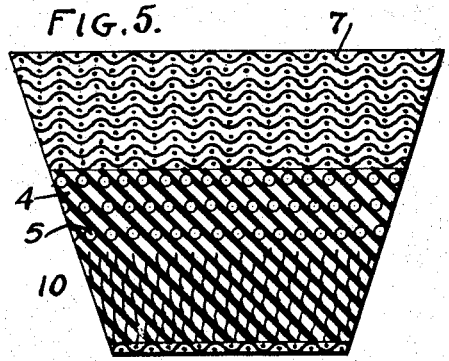
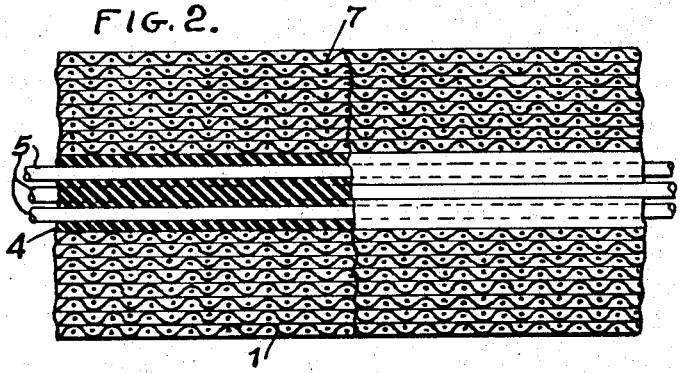
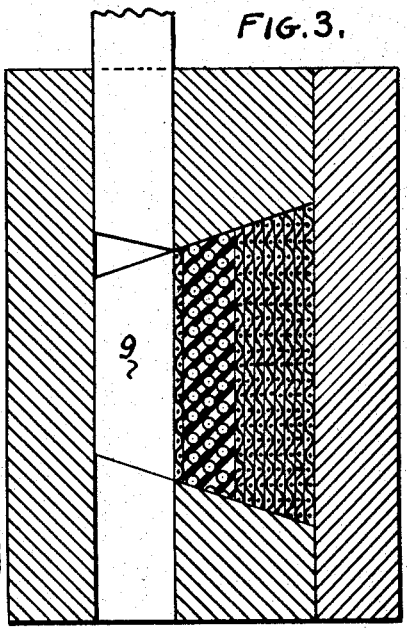
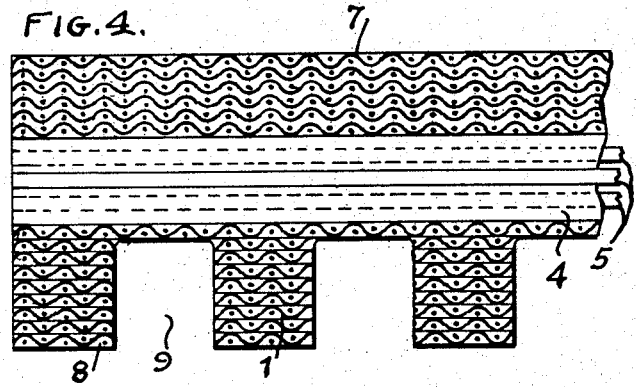
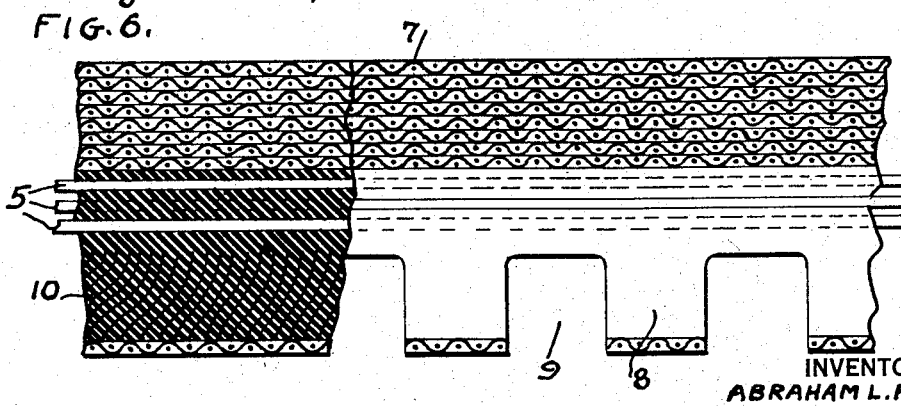
INVENTOR
ABRAHAM L. FREEDLANDER,
BY
ATTORNEYS Patented Dec. 24, 1935

2,025,278

UNITED STATES PATENT OFFICE 2,025,278

METHOD OF MAKING POWER TRANSMISSION BELTS

Abraham L. Freedlander, Dayton, Ohio, assignor to The Dayton Rubber Manufacturing Company, Dayton, Ohio, a corporation of Ohio Application May 12, 1934, Serial No. 725,398

2 Claims. (Cl. 154—4)

My invention relates to a method of making power transmission belts.

It is the object of my invention to provide a method of making power transmission belts, having a compression section, a neutral axis section and a tension section with portions of the compression section removed to permit of the passage of the belt around pulleys of small diameter in use with short center drives, while, at the same time, employing, if desired, material normally difficult to compress, such as straight laid fabric.

Attention is called to applications 550,477, filed July 13, 1931 and 635,967, filed Oct. 3, 1932 which are related to similar subject matter as this application.

This application which bears Serial No. 725,398 refers to the method of making power transmission belts, while my companion application Serial No. 725,397 covers the belt or product resulting from such a method. Both of these applications were filed on the same date, to wit, May 12, 1934.

Referring to the drawing:

Figure 1 is a section through a typical belt;

Figure 2 is a side elevation thereof partially in section;

Figure 3 shows the belt having a portion sheared from the compression section to form a toothed inner wall;

Figure 4 is a side elevation of the belt with the teeth formed on the inner wall;

Figure 5 is a modification of the belt;

Figure 6 is a side elevation of the belt, partially in section, with some of the teeth cut away.

Referring to the drawing in detail, 1 indicates one of the layers of straight laid fabric, of which there are a number to form the compression section 2. Mounted upon the compression section 2 is a neutral axis section 3 composed of the rubber 4 and the cords 5.

These cords are inextensible so that the belt has a fixed length.

The exterior of the belt is composed of a plurality of layers 7 of straight laid fabric or fabric laid on the bias. This fabric is rubberized or in effect coated with rubber in a plastic state. In that state the rubber is vulcanized, so that it forms ultimately a three-part construction, with the materials of each part adhesively united.

Thereafter, the belt is cut to the proper trapezoidal section and vulcanized whereupon teeth are formed as at 8 in the compression section by shearing the sections 9 therefrom so that the belt can bend sufficiently to pass over pulleys of very small diameter and short section.

Referring to Figures 5 and 6, the compression section may be made with a combination of rubber and very fine, integrally mixed textile fibers 10. In such an event the belt is vulcanized and teeth are formed in the under surface as previously described.

It will be thus seen that it is the object of my invention to provide an integral structure having a compression section, a neutral axis section and a tension section, which is completely manufactured; and after which there are cut from the inner margin certain portions designated 8, to form teeth.

It will be understood that I desire to comprehend within my invention such modifications as may be necessary to adapt it to varying conditions and uses.

Having thus fully described my invention, what I claim as new and desire to secure by Letters Patent, is:

1. In a method of forming a toothed power transmission belt, the following steps: (a) building up a compression member of rubberized fabric, then a neutral axis member comprising inextensible longitudinally-placed rubberized cords, and then a tension member consisting of rubberized woven fabric; (b) including in the compression member a continuous inner portion thereof to constitute a body which acts to interconnect the material of which the teeth are to be formed connecting together permanently by vulcanization the compression member, neutral axis member and tension member so that they lie in separate parallel planes and present their respective side edges to the driving surfaces; and (c) subjecting said compression member to a shearing action whereby to remove therefrom portions thereof to leave open spaces alternating with the teeth so formed of the material and to leave a continuous portion adjacent and connected to said neutral axis member.

2. In a method of forming a toothed power transmission belt, the following steps: (a) building up a compression member, then a neutral axis member, and then a tension member; (b) including in the compression member a continuous inner portion thereof to constitute a body which acts to interconnect the material of which the teeth are to be formed; connecting together permanently by vulcanization the compression member, neutral axis member and tension member so that they lie in separate parallel planes and present their respective side edges to the driving surfaces; and (c) subjecting said compression member to a shearing action whereby to remove therefrom portions thereof to leave open spaces alternating with the teeth so formed of the material, and to leave a continuous portion adjacent and connected to said neutral axis member.

ABRAHAM L. FREEDLANDER.